US012602046B2

(12) United States Patent
Yamamoto et al.

(10) Patent No.: US 12,602,046 B2
(45) Date of Patent: Apr. 14, 2026

(54) AUTOMATIC WATERCRAFT PILOTING SYSTEM AND AUTOMATIC WATERCRAFT PILOTING ASSIST METHOD

(71) Applicant: HONDA MOTOR CO., LTD., Tokyo (JP)

(72) Inventors: Yosuke Yamamoto, Saitama (JP); Daisuke Nojiri, Saitama (JP); Yuichi Kobayashi, Shizuoka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/341,344

(22) Filed: Jun. 26, 2023

(65) Prior Publication Data

US 2024/0427329 A1    Dec. 26, 2024

(51) Int. Cl.
| | |
|---|---|
| *G05D 1/00* | (2024.01) |
| *B63B 79/15* | (2020.01) |
| *B63B 79/40* | (2020.01) |
| *B63H 21/21* | (2006.01) |
| *B63H 25/04* | (2006.01) |
| *G01C 21/20* | (2006.01) |
| *G08G 3/00* | (2006.01) |
| *G08G 3/02* | (2006.01) |

(52) U.S. Cl.
CPC ........... *G05D 1/0206* (2013.01); *B63B 79/15* (2020.01); *B63B 79/40* (2020.01); *B63H 21/21* (2013.01); *G01C 21/203* (2013.01); *G08G 3/00* (2013.01); *B63H 2021/216* (2013.01)

(58) Field of Classification Search
CPC ...... G05D 1/0206; B63B 79/15; B63B 79/40; B63H 21/21; G01C 21/203
See application file for complete search history.

(56) References Cited

U.S. PATENT DOCUMENTS

| | | | | |
|---|---|---|---|---|
| 2012/0277941 A1* | 11/2012 | Noffsinger | ............... | G08G 3/00 |
| | | | | 701/21 |
| 2019/0145794 A1* | 5/2019 | Ketchell, III | ...... | G01C 21/3667 |
| | | | | 701/439 |
| 2019/0155288 A1* | 5/2019 | Arbuckle | ................ | B63B 79/15 |
| 2024/0202655 A1* | 6/2024 | Jordi Ballester | ........................... | |
| | | | | G06Q 10/08355 |

FOREIGN PATENT DOCUMENTS

JP         2021076537 A  *  5/2021

* cited by examiner

*Primary Examiner* — David P. Merlino
*Assistant Examiner* — Mahmoud M Kazimi
(74) *Attorney, Agent, or Firm* — Armstrong Teasdale LLP

(57) ABSTRACT

In automatic watercraft piloting system, a control unit computes a plurality of first routes from a current position to a target position that avoid any obstacle that may exist between the current position and the target position, computes a second route for each of the first routes that the watercraft is predicted to travel when the propulsion device and the steering device are controlled by the control unit so as to follow the particular first route under an interference identified by an obstacle identification device, select one of the second routes that brings the watercraft to a spot nearest to the target position as an optimum route, and control the propulsion device and the steering device so as to cause the watercraft to progress along the first route that corresponds to the optimum route in absence of the interference.

11 Claims, 6 Drawing Sheets

*Fig.3*

AUTOMATIC WATERCRAFT PILOTING SYSTEM AND AUTOMATIC WATERCRAFT PILOTING ASSIST METHOD

TECHNICAL FIELD

The present disclosure relates to an automatic watercraft piloting system and an automatic watercraft piloting assist method for piloting watercraft to a prescribed target position.

BACKGROUND ART

In recent years, there have been active efforts to provide access to sustainable transportation systems that consider vulnerable people that can be found among transportation participants. For example, in order to further improve the safety and convenience of transportation means, research and development efforts have been directed to automatic piloting of various forms of watercraft.

Among various aspects of watercraft piloting, docking watercraft is considered to be highly difficult. JP2021-76537A discloses a watercraft docking assist system. This system acquires watercraft information including the position and speed of the watercraft, and acquires constraining conditions and interference conditions that are present in the water leading to the pier or the like. More specifically, the watercraft docking assist system acquires a wind direction, a wind speed, a wave height and a sea current by using various means such as a wind speed/direction meter, a wavemeter, a sea current speed meter, and meteorological and oceanographic information receivers. The watercraft docking assist system generates a planned route according to the state of the watercraft, the constraining conditions and the interference conditions, and generates piloting information for causing the watercraft to follow the planned route. The watercraft docking assist system automatically pilots the watercraft by controlling the steering device, the propulsion device and the thruster device of the watercraft according to the piloting information.

In generating the planned route, the watercraft docking assist system designates a plurality of waypoints between the start position and the docking position, and simulates the piloting of the watercraft along various routes that pass these waypoints. An optimum route is selected from a plurality of simulation tries. By performing a large number of simulations, an optimum route can be selected in an accurate manner. When the watercraft actually follows the optimum route, the watercraft docking assist system updates the optimum course according to the status of the watercraft such as the current position thereof, and modifies the optimum route as required.

This known watercraft docking assist system can plan an optimum route at high accuracy by taking into account external interferences, and guide the watercraft to the docking position in a reliable manner during the course of automatically piloting the watercraft. However, this watercraft docking assist system requires a high computational load during the repeated simulations, and requires a high performance, and expensive computer which is not suited to be installed in small watercraft. Furthermore, the operators of small watercraft often lack experience, and may experience difficulty using such a complex computer for piloting the watercraft.

SUMMARY OF THE INVENTION

In view of such a problem of the prior art, a primary object of the present invention is to provide an automatic watercraft piloting system and an automatic watercraft piloting assist method so that an unskilled operator can comfortably pilot watercraft by allowing the watercraft to be automatically piloted, and a contribution is made to the development of sustainable transportation systems.

To achieve such an object, a certain aspect of the present invention provides an automatic watercraft piloting system for assisting in piloting of watercraft from a start position to a target position, comprising: a current position detecting device (21) for detecting a current position (Pp) of the watercraft; an interference detecting device (22, 24) for identifying an interference that affects navigation of the watercraft; an input unit (23) for accepting the target position of the watercraft; an obstacle identification device (22, 26) that identifies an obstacle (34) located between the start position and the target position; a propulsion device (3, 4) that provides a propelling power to the watercraft; a steering device (5) that changes a heading of the watercraft; and a control unit (10) for controlling the propulsion device and the steering device, wherein the control unit is configured to set the start position when the target position is accepted by the input unit; compute a plurality of first routes from the current position to the target position that avoid any obstacle that may exist between the current position and the target position, compute a second route for each of the first routes that the watercraft is predicted to travel when the propulsion device and the steering device are controlled by the control unit so as to follow the particular first route under the interference identified by the obstacle identification device, select one of the second routes that brings the watercraft to a spot nearest to the target position as an optimum route, and control the propulsion device and the steering device so as to cause the watercraft to progress along the first route that corresponds to the optimum route in absence of the interference.

According to this configuration, the automatic watercraft piloting system causes the watercraft to be piloted along the first route, that corresponds to the optimum route selected from the second routes, without considering the existence of interferences. Therefore, the watercraft can be piloted without requiring complex computations, and users lacking in the experience of docking the watercraft can operate the watercraft without any concern.

Preferably, in this automatic watercraft piloting system, the control unit computes the first routes so that initial headings of the watercraft include a plurality of different headings.

Thereby, a wide range of options may be provided to the selection of the second routes that can bring the watercraft close to the target position while avoiding the obstacle so that the desirability of the optimum route can be enhanced. The term heading as used herein means the orientation of the watercraft or the direction in which the bow of the watercraft is facing.

Preferably, in this automatic watercraft piloting system, the control unit computes the first routes such that a minimum radius of curvature of each first route is larger than a minimum turning radius of the watercraft.

Thereby, the watercraft can be navigated without causing any difficulty. In particular, it is desirable that the maximum rudder angle during the passage is minimized.

Preferably, in this automatic watercraft piloting system, the control unit is provided with a control map that gives a deviation of the watercraft from a nominal course for each combination of a rudder angle and a propulsion force of the watercraft, and the interference, and is configured to compute the second routes by looking up the control map.

Thereby, the control unit is enabled to compute the second route for each of the first routes with a minimum computational load owing to the use of the control map.

Preferably, in this automatic watercraft piloting system, the interference includes a wind direction and a wind speed.

By taking into account the wind direction and the wind speed which are considered to be dominant in causing a deviation to the course of the watercraft, the second routes can be computed in an accurate manner. This accuracy can be further improved by further taking into account the current direction and the current speed.

Preferably, in this automatic watercraft piloting system, the deviation includes a positional error and a heading error.

Thereby, the second routes can be computed in a both simple and accurate manner.

Preferably, in this automatic watercraft piloting system, the values of the positional error and the heading error are determined from a computer simulation.

Thereby, the automatic watercraft piloting system can be easily adapted to a wide range of watercraft with ease.

Preferably, in this automatic watercraft piloting system, values of the positional error and the heading error are determined by taking into account a past operation record of the watercraft.

Thereby, the automatic watercraft piloting system can be adapted to each particular watercraft, and the second routes can be computed in an accurate manner.

Preferably, in this automatic watercraft piloting system, the obstacle identification device includes an obstacle sensor (29, 30) that detects a surrounding obstacle, and/or an obstacle information acquiring device (22) that acquires information on the obstacle from an external information source.

Thereby, an obstacle that may exist between the start point and the target point can be identified with ease.

Preferably, in this automatic watercraft piloting system, the interference detecting device includes an interference sensor (26, 27, 28) that detects an actual interference at the start position, and/or an interference information acquiring device (22) that acquires information on the interference from an external information source.

Thereby, an interference that may affect the navigation of the watercraft can be identified with ease.

To achieve the foregoing object, another aspect of the present invention provides a watercraft piloting assist method for assisting in piloting of watercraft (2) from a start position (Ps) to a target position (Pt), which is configured to be implemented by a computer to execute the steps of: acquiring a current position (Pp) of the watercraft (ST1); identifying an interference that affects navigation of the watercraft (ST2); acquiring the target position (ST4); setting the start position, and identifying an obstacle that may be located between the start and the target position (ST5); computing a plurality of first routes (R1) from the start position to the target position that avoid any obstacle that may exist between the start position and the target position (ST6); computing a second route (R2) for each of the first routes that the watercraft is predicted to travel when a propulsion device and a steering device are controlled by a control unit so as to follow the particular first route under the identified interference (ST7); selecting one of the second routes that brings the watercraft to a spot nearest to the target position as an optimum route (R2b) (ST8); and controlling the propulsion device and the steering device so as to cause the watercraft to progress along the first route that corresponds to the optimum route in absence of the interference (ST9).

According to this configuration, the automatic watercraft piloting system causes the watercraft to be piloted along the first route, that corresponds to the optimum route selected from the second routes, without considering the existence of interferences. Therefore, the watercraft can be piloted without requiring complex computations, and users lacking in the experience of docking the watercraft can operate the watercraft without any concern.

Thus, the present invention provides an automatic watercraft piloting system and an automatic watercraft piloting assist method so that an unskilled operator can comfortably pilot watercraft by allowing the watercraft to be automatically piloted, and a contribution is made to the development of sustainable transportation systems.

BRIEF DESCRIPTION OF THE DRAWING

FIG. 3 is a diagram showing first routes;

DESCRIPTION OF THE PREFERRED EMBODIMENT(S)

Figure 1:
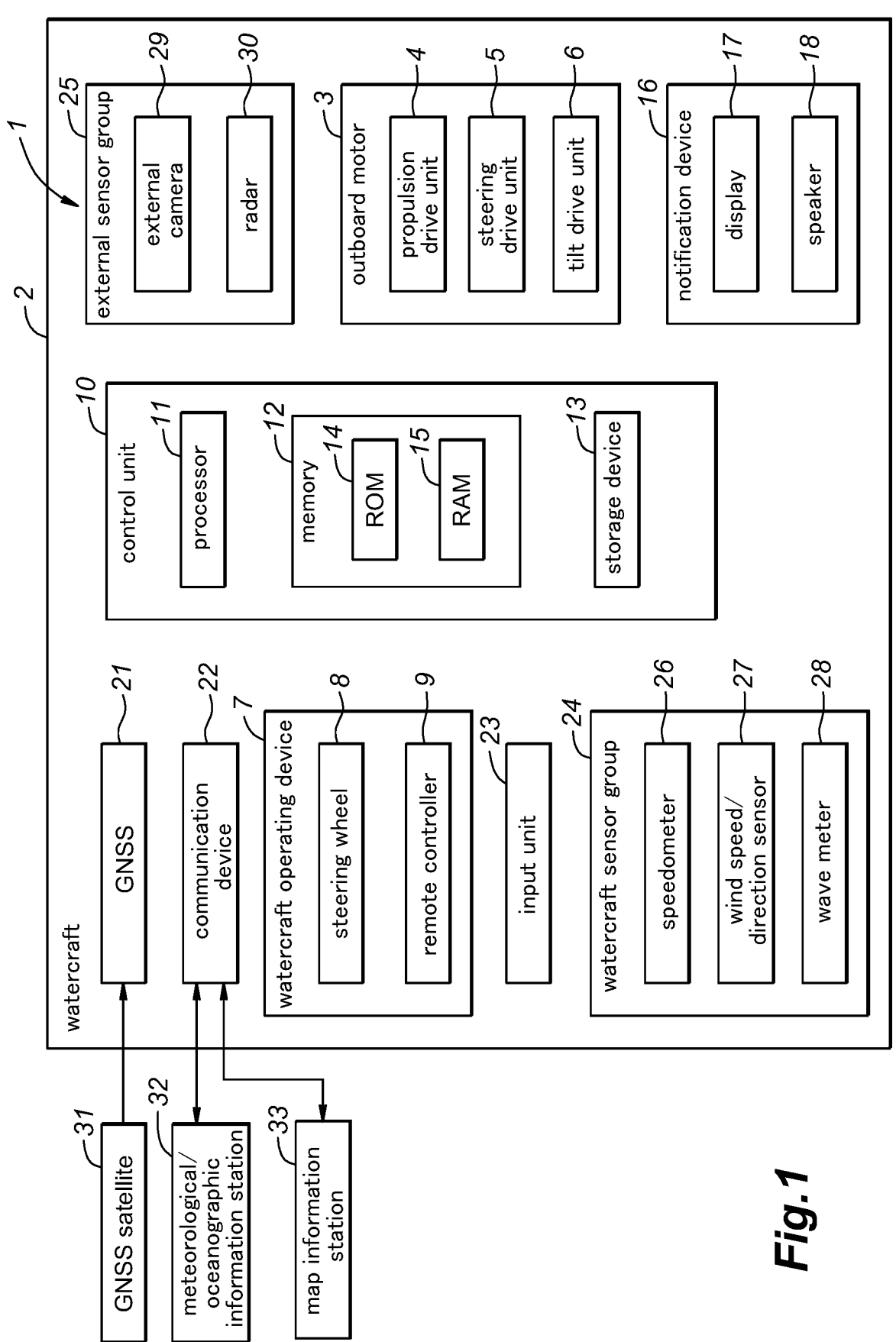
FIG. 1 is a block diagram of watercraft incorporated with an automatic watercraft piloting system according to an embodiment of the present invention.

FIG. 1 is a schematic diagram of watercraft 2 incorporated with an automatic watercraft piloting system 1 according to an embodiment of the present invention. The watercraft 2 consists of a small boat fitted with an outboard motor 3 as a propulsion device. The watercraft 2 may also be fitted with multiple outboard motors 3. In this case, the outboard motor 3 is attached to the stern of the watercraft 2 so as to be tiltable around a vertical axis and a lateral axis.

The outboard motor 3 is a propulsion device that generates a propulsion force, and includes a propeller in a lower end thereof, and a drive source for driving the propeller. The drive source may be an internal combustion engine or an electric motor. A watercraft operating device 7 for operating the outboard motor 3 is installed in the cabin of the watercraft 2. The watercraft operating device 7 includes a steering wheel 8 for changing the heading of the watercraft 2 by turning the outboard motor about a vertical axis, and a remote controller 9 for changing the propulsion force of the watercraft 2. The steering wheel 8 may be of a steer-by-wire type, a cable type or a mechanical type which is configured to be operated by a user, and is additionally provided with a steering drive unit 5 which is a servo actuator for electronic steering control. The remote controller 9 may be of a lever type or a dial type which is configured to be operated by a user, and is additionally provided with a propulsion drive unit 4 which is a servo actuator for electronic propulsion control.

The outboard motor 3 also includes a tilt drive unit 6 for tilting the outboard motor 3 about the horizontal axis. The propulsion drive unit 4, the steering drive unit 5 and the tilt drive unit 6 each have an electric motor as a drive source. The steering drive unit 5 is a steering device for changing the heading of the watercraft 2. The steering drive unit 5 sets the rudder angle of the watercraft 2 by turning the outboard motor 3, but may also be configured to set the rudder angle by turning a rudder plate provided behind the propeller around the vertical axis.

Also, the watercraft 2 is equipped with a control unit 10 that controls the outboard motor 3 by using the propulsion drive unit 4 and the steering drive unit 5. The control unit 10 is an electronic control unit essentially consisting of a computer, which includes a processor 11 such as a central processing unit (CPU), memory 12, and a storage device 13, and is configured to execute predetermined arithmetic processing. The memory 12 comprises read only memory (ROM 14) and random access memory (RAM 15). The storage device 13 may be a hard disk drive (HDD), solid state drive (SSD), or the like. The control unit 10 is programmed so that the processor 11 reads necessary data and application software from the storage device 13 and executes a predetermined arithmetic processing according to the application software.

The control unit 10 controls the outboard motor 3 based on an input to the watercraft operating device 7. More specifically, the control unit 10 controls the steering drive unit 5 according to the steering amount of the steering wheel 8 so that the propeller may be oriented in a corresponding direction. Further, the control unit 10 controls the propulsion drive unit 4 so that the propeller generates a corresponding propulsion force according to the operating amount of the remote controller 9. Further, the control unit 10 controls the tilt drive unit 6 so that the propeller is submerged in the water or raised in the air according to the operation of a tilt switch (not shown the drawings).

In addition, a notification device 16 is mounted in the cabin of the watercraft 2. The notification device 16 has a display 17 and a speaker 18. The notification device 16 is connected to and controlled by the control unit 10. The display 17 displays a screen displaying various pieces of information about the watercraft 2 and a guidance screen of the navigation device. Objects (obstacles) around the watercraft 2 (other ships, embankments, piers, etc.) are displayed on the guidance screen of the navigation device. It should be noted that the control unit 10 may be configured as a piece of hardware, or may be configured as a unit composed of a plurality of pieces of hardware.

Furthermore, the watercraft 2 is equipped with a satellite positioning system (GNSS 21), a communication device 22, an input unit 23, a watercraft sensor group 24, and an external sensor group 25. The watercraft sensor group 24 includes a speedometer 26, a wind speed/direction meter 27 and a wave meter 28. The external sensor group 25 includes an external camera 29 and a radar 30. The external sensor group 25 may include a LIDAR (Laser Imaging Detection and Ranging). The GNSS 21, the communication device 22, the input unit 23, the watercraft sensor group 24 and the external sensor group 25 are connected to the control unit 10.

The GNSS 21 receives information such as satellite positions and transmission times transmitted from a plurality of GNSS satellites 31, and determines the position of the GNSS 21 by computation using such information. In other words, the GNSS 21 is a current position detection device that detects the current position Pp of the watercraft 2.

The communication device 22 performs wireless communication with other watercraft and base stations according to a command from the control unit 10. The communication device 22 comprises a transmission antenna and a reception antenna. The communication device 22 can transmit information including the position of the watercraft 2 to the outside using the transmitting antenna.

The communication device 22 receives meteorological and oceanographic information from a meteorological/oceanographic information station 32 via the receiving antenna. The meteorological information may include cloudiness, temperature, humidity, air pressure, wind direction, wind speed, and the like. The oceanographic information may include tidal condition, tidal current, wave height, wave direction, wave period, and the like. If the watercraft 2 is navigating on a river, the communication device 22 may receive river information instead of or in addition to oceanographic information. The river information may include water level, river flow (direction) and flow velocity, and the like. The communication device 22 functions as a part of an interference information acquisition device that acquires interference information at the current position Pp of the watercraft 2.

In addition, the communication device 22 receives map information from a map information station 33 or a regional information station provided in a marina or the like via the receiving antenna. The map information may include information on obstacles (see FIG. 3) on the water which may include the positions and shapes of piers, breakwaters and others which may be either natural or manmade. The communication device 22 thus functions as an obstacle information acquisition device that acquires obstacle information.

The control unit 10 acquires the map information via the communication device 22, and creates a map on which the external information acquired by the external sensor group 25 is superimposed. More specifically, the control unit 10 superimposes the obstacles 34 acquired by the radar 30 and LIDAR on the map, and determines the attributes of various areas in the image acquired by the external camera 29 (water surface, sky, own watercraft, other watercraft, piers, harbors, beaches, trailers, and other obstacles).

The input unit 23 is provided in the cabin and receives input of commands relating to automatic piloting of the watercraft 2 performed by the automatic watercraft piloting system 1. Commands related to automatic watercraft piloting include the start of guidance, setting of a target position Pt for automatic watercraft piloting, the start of automatic watercraft piloting, the termination of automatic watercraft piloting, and the like. The input unit 23 may include buttons and a joystick provided near the display 17. The display 17 may be configured as a touch panel that serves as the input unit 23 or a part thereof.

The control unit 10 is configured to control the propulsion drive unit 4 and the steering drive unit 5 upon receiving a command to start automatic watercraft piloting from the input unit 23 so that the watercraft 2 advances along the predetermined route set by the control unit 10.

The watercraft speedometer 26 of the watercraft sensor group 24 detects the sailing speed of the watercraft 2 (relative speed with respect to the water). The sea current (direction and speed of the surrounding water) can be obtained from the difference between the speed detected by the speedometer 26 and the absolute moving speed of the watercraft 2 (which may be acquired by the GNSS 21). The speedometer 26 and the wind speed/direction meter 27 detect the direction and speed (relative speed) of the wind that the watercraft 2 receives. The wave meter 28 detects the wave height, wave direction, and wave period from the pitching, vertical movement, and the like of the watercraft 2. Thus, the watercraft speedometer 26, wind speed/direction meter 27, and wave meter 28 serve as interference sensors that detect actual interferences at the current position Pp of the watercraft 2 that affect the navigation of the watercraft 2.

The external camera 29 of the external sensor group 25 captures images of objects existing around the watercraft 2. The radar 30 emits radio waves such as millimeter waves around the watercraft 2 and captures the reflected waves, thereby detecting the relative positions of objects existing around the watercraft 2 with respect to the watercraft 2. Thus, the radar 30 of the external sensor group 25 is an obstacle sensor that detects objects around the watercraft 2 as obstacles 34. Also, the images captured by the external camera 29 are analyzed and used to determine attributes of objects existing around the watercraft 2. Thus, the external camera 29 is also an obstacle sensor that detects obstacles 34 around the watercraft 2.

Further, the automatic watercraft piloting system 1 may specify surrounding obstacles 34 by means of an obstacle information acquisition device such as a communication device 22 that acquires information on obstacles 34 existing around the watercraft 2. The automatic watercraft piloting system 1 may identify interferences at the current position Pp by means of an interference information acquisition device that acquires interference information at the current position Pp of the watercraft 2. Alternatively, the automatic watercraft piloting system 1 may identify interferences at a plurality of points along the route of the watercraft 2.

The control unit 10 controls the outboard motor 3 according to the input to the watercraft operating device 7 for manual operation, and also controls the outboard motor 3 according to the input to the watercraft operating device 7 for automatic operation. More specifically, when the input unit 23 receives an input for automatic watercraft piloting, the control unit 10 controls the outboard motor 3 to move the watercraft 2 from the current position Pp which is designated as the start position Ps to the target position Pt according to a prescribed automatic control principle which may be referred to as automatic watercraft piloting control.

Next, the automatic watercraft piloting control performed by the control unit 10 will be described in more detail with reference to FIGS. 2 to 6.

Figure 2:
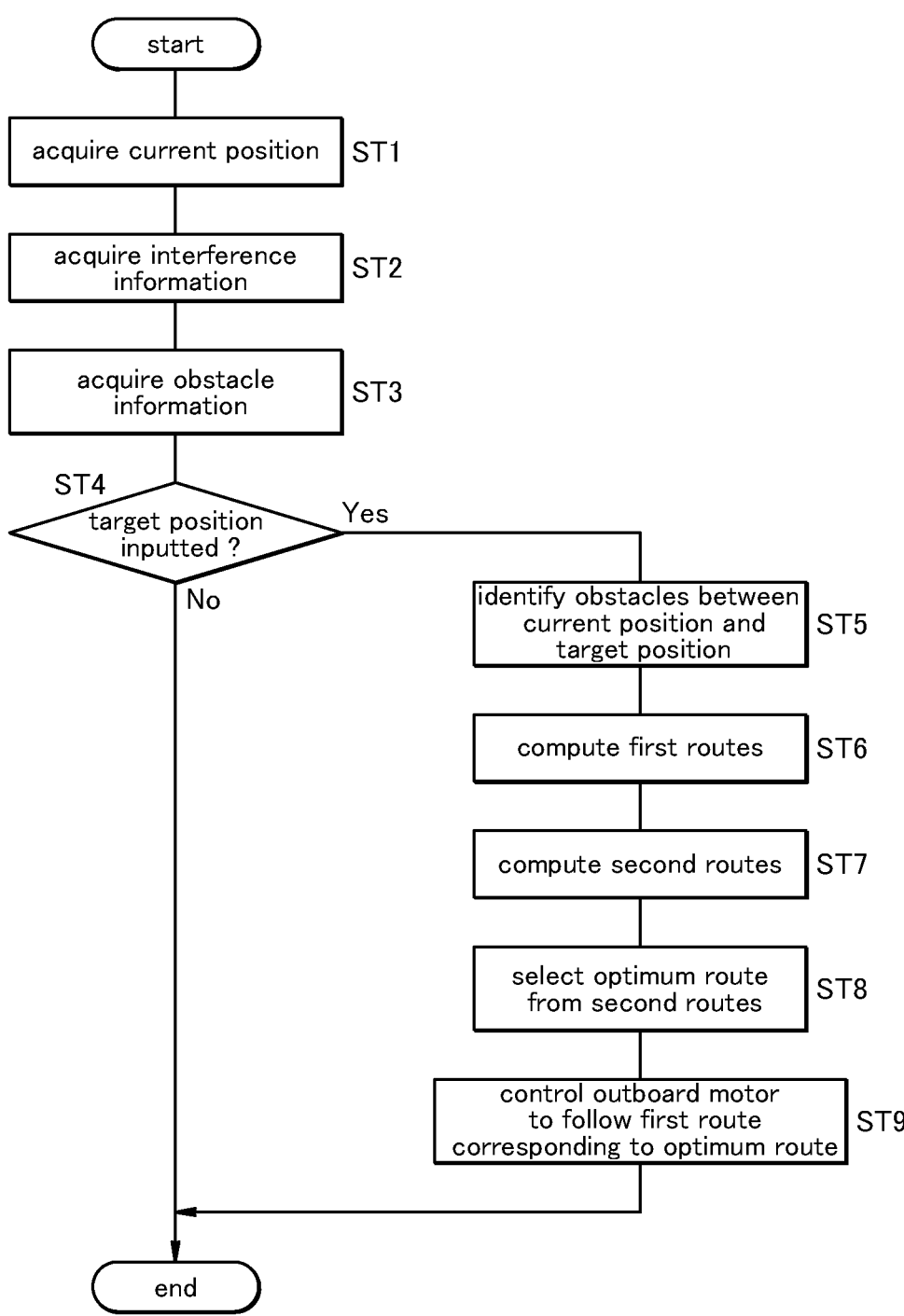
FIG. 2 is a flowchart of the process of piloting watercraft with the automatic watercraft piloting system of the present embodiment.

FIG. 2 is a flowchart showing the process of automatic watercraft piloting by the automatic watercraft piloting system 1 according to the present embodiment. Upon activation, the control unit 10 of the automatic watercraft piloting system 1 performs automatic watercraft piloting process according to the routine shown in FIG. 2. The control unit 10 repeats the automatic watercraft piloting process routine shown in FIG. 2 at predetermined control intervals.

The control unit 10 acquires the current position Pp of the watercraft 2 (step ST1), acquires interference information (step ST2), and acquires external obstacle information (step ST3). These steps may be performed in this order or in a different order. Moreover, these processing cycles for these steps may be the same or may be different from each other.

More specifically, in step ST1, the control unit 10 detects the current position of the watercraft 2 based on the information received from the GNSS satellites 31. In step ST2, the control unit 10 acquires at least one of detected interference information such as a wind direction, wind speed, wave direction, wave period detected by the speedometer 26, the wind speed/direction meter 27, and the wave meter 28, and received information at the current position Pp of the watercraft 2 acquired via the communication device 22. In step ST3, the control unit 10 acquires obstacle information around the watercraft 2 from at least one of the radar 30 and the communication device 22.

In other words, interference sensors such as the watercraft speedometer 26, the wind speed/direction meter 27, and the wave meter 28 and/or the communication device 22 may form an interference identification device for identifying interferences at the start position Ps of the watercraft 2. Likewise, obstacle sensors such as the external camera 29 and the radar 30 and/or the communication device 22 may form an obstacle identification device for identifying obstacles located between the start position Ps and the target position Pt.

The control unit 10 determines if there is an input of the target position Pt from the input unit 23, or more specifically, if there is an input of the target position Pt and the start command for automatic piloting (step ST4). If there is no input for the target position Pt and the start command for automatic piloting (ST4: No), the control unit 10 does not perform any process and ends the routine for the automatic piloting process. When the target position Pt and the start command for automatic piloting are inputted (ST4: Yes), the control unit 10 performs the process of steps ST5 to ST9.

In step ST5, the control unit 10 sets the current position Pp as the start position Ps and identifies the obstacles 34 between the start position Ps and the target position Pt of the watercraft 2 from the obstacle information acquired at step ST3. The start position Ps may not be the current position Pp, but a position designated on the map of a navigation device. The watercraft may reach the start position Ps manually or by other means.

In other words, the obstacle identification device can be configured by any combination of the external camera 29, radar 30, and LIDAR, which are obstacle sensors that detect surrounding objects as obstacles 34, and the communication device 22 that acquires obstacle information. This configuration allows to identify the obstacles 34 between the start position Ps and the target position Pt of the watercraft 2.

Figure 3:
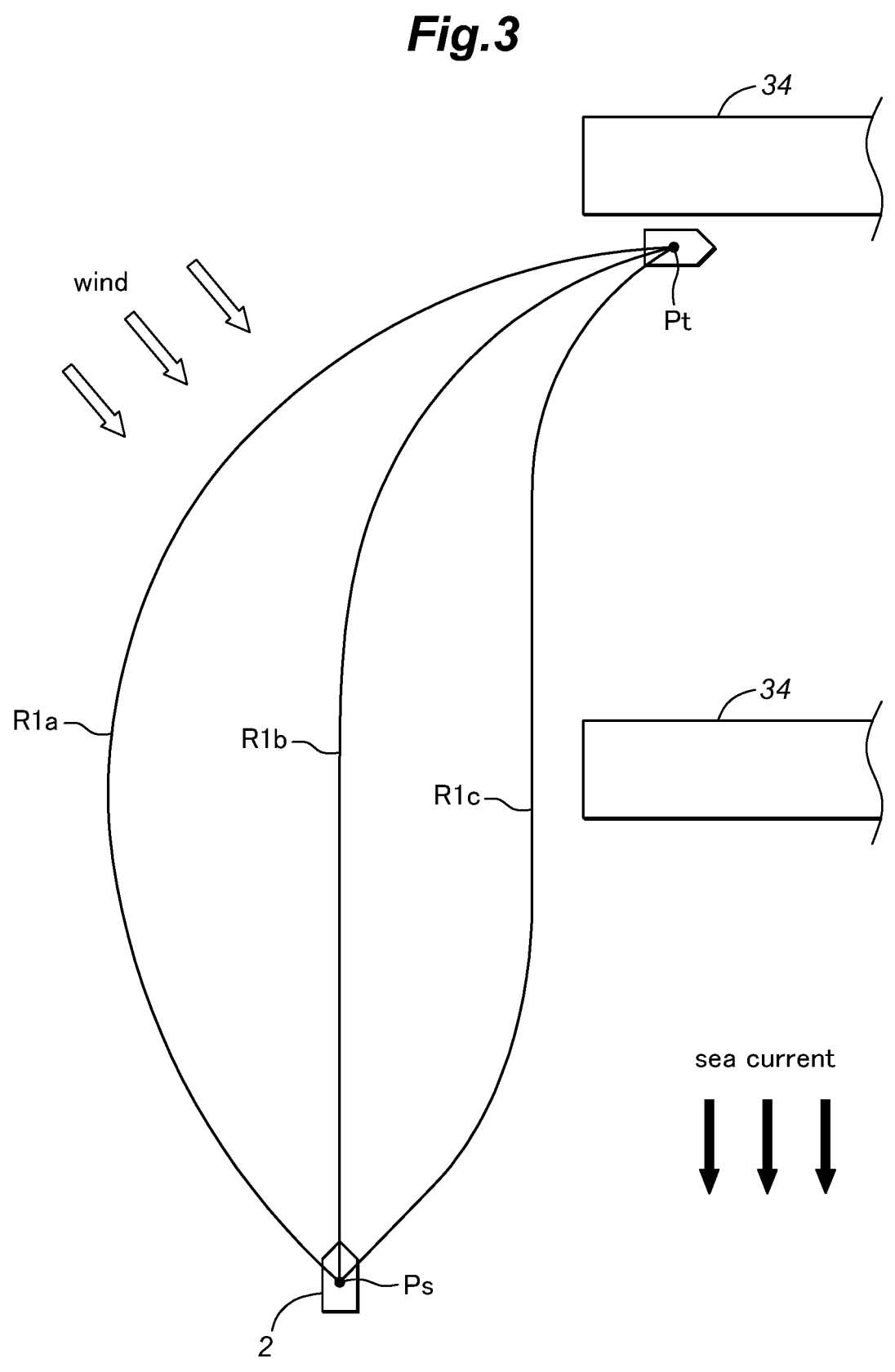

In subsequent step ST6, the control unit 10 computes a plurality of first routes R1 (R1*a*, R1*b*, R1*c*) from the start position Ps to the target position Pt in such a manner that the obstacles 34 are avoided as shown in FIG. 3. In the illustrated example, the control unit 10 computes three first routes R1*a*, R1*b*, R1*c*. In other embodiments, the control unit 10 may calculate four or more first routes R1.

The control unit 10 computes or generates the first routes R1 so that the initial heading of the first routes R1 includes a plurality of mutually different directions. The initial heading provides favorable options for selection of the first routes R1 that avoid the obstacles 34 and allow the watercraft 2 to reach the target position Pt. Further, the control unit 10 computes the first routes R1 such that the radii of curvature included in the first routes R1 are larger than the minimum turning radius of the watercraft 2.

Figure 4:
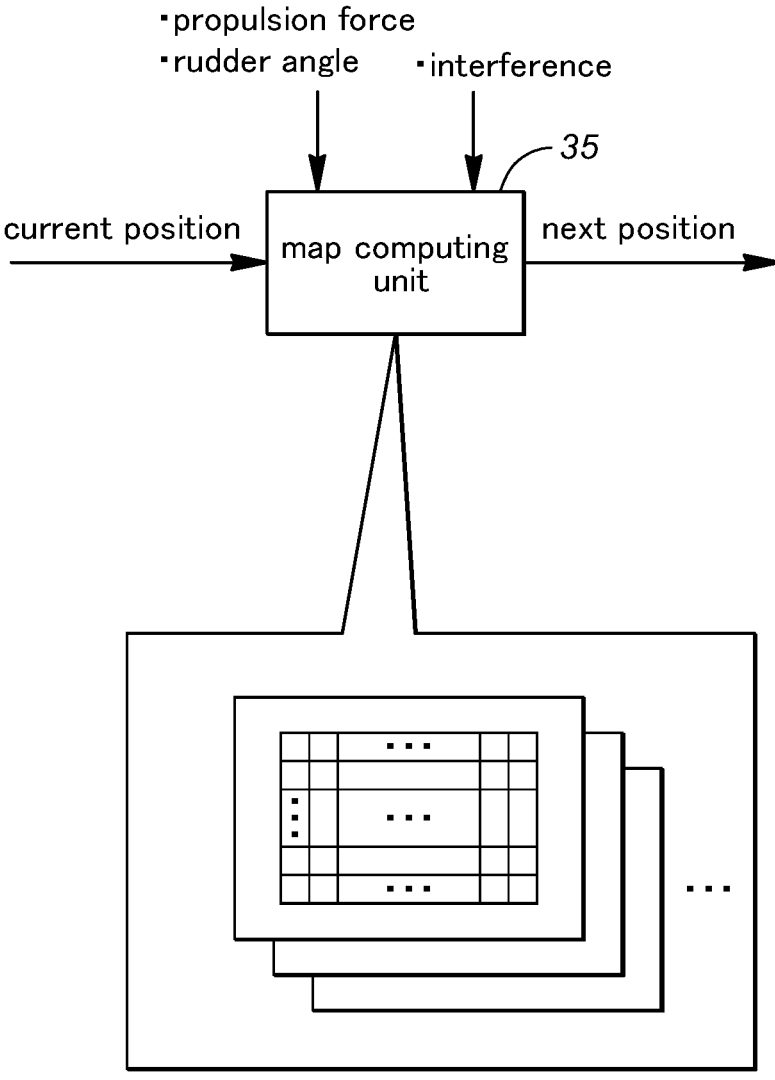
FIG. 4 is a diagram illustrating a part of the control unit for computing second routes.

In subsequent step ST7 in FIG. 2, the control unit 10 computes a second route R2 (R2*a*, R2*b*, R2*c*) which the watercraft 2 is predicted to follow with the external interferences taken into account when the watercraft 2 is piloted so as to follow each of the first routes R1 (R1*a*, R1*b*, R1*c*) disregarding the external interferences. This may be performed by using a suitable formula. In the present embodiment, however, this is performed by using a suitable map. As shown in FIG. 4, the control unit 10 includes a map computing unit 35. When computing the second routes R2, each second route R2 is computed by referring to a control map stored in advance in a map computing unit 35. The map computing unit 35 receives the output of the watercraft 2 including the propulsive force and the rudder angle of the outboard motor 3, and the external interferences.

The map computing unit 35 is configured to produce a deviation (positional error and heading error) for a given propulsion force and the rudder angle of the outboard motor 3 under various interferences such as the wind direction, the wind speed, the direction of the current, and the speed of the current. By thus obtaining the deviation by referring to the control map and computing the second routes R2 based on the obtained deviations, the second routes R2 can be computed with a small computational load.

In addition, by including the interferences such as the wind direction and wind speed as a part of the parameters of the control map, the second routes R2 can be computed with a high accuracy since the wind direction and wind speed are major factors in determining the course of the watercraft 2. In addition, the accuracy may be further improved by including the current direction and speed as additional parameters.

Figure 5:
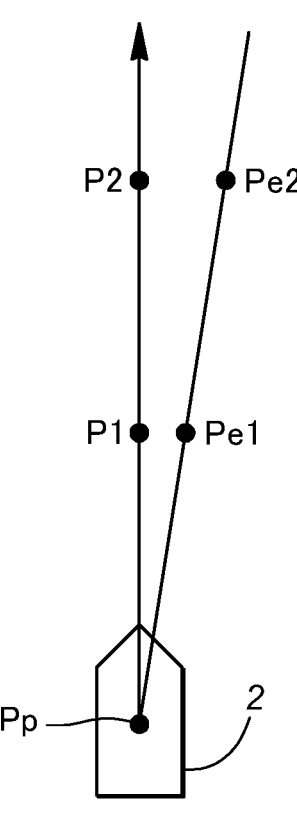
FIG. 5 is a diagram illustrating the process of computing the second routes.
Figure 6:
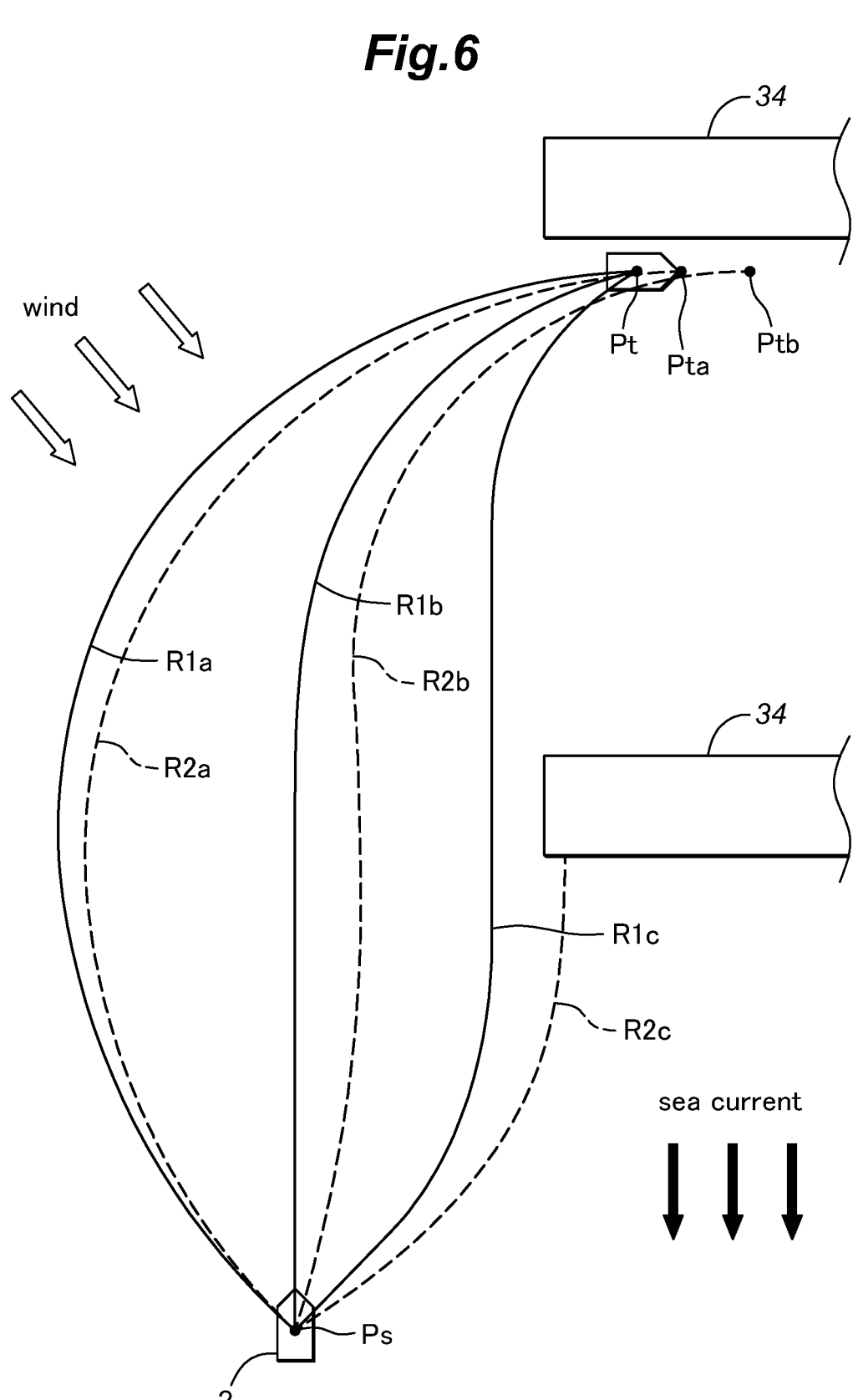
FIG. 6 is a view similar to FIG. 3 showing the second routes computed from the corresponding first routes.

As shown in FIG. 5, the control unit 10 estimates the position and heading of the watercraft 2 that the watercraft 2 is expected to follow from the start position Ps by looking up the control map in an incremental manner. The increment may be either time or distance. In this embodiment, a predetermined time is used as the incremental unit.

The control map for producing the deviations may be created by using a computer simulator. The simulator takes into account various conditions such as the propulsion force, the rudder angle, the wind speed, the wind direction, etc., and predicts the deviation of the watercraft 2 from the nominal course based on these conditions. Typically, the control map may be tailor-made for each particular watercraft. Thereby, the automatic watercraft piloting system 1 can be adapted to a wide range of watercraft.

Alternatively, the control map may also be created according to the actual navigation data of the particular watercraft. Thereby, the second routes R2 may be computed with an improved accuracy.

The process of computing the second routes R2 will be described in the following with reference to FIG. 5. Starting from the start position Ps (including start position information and start direction information), the watercraft 2 should reach a first predicted point P1 for the given propulsive force and the rudder angle of the outboard motor 3 after elapsing of the prescribed incremental time. The first predicted point P1 is on the first route R1. Then, the control unit 10 estimates a first corrected predicted position Pe1 at which the watercraft 2 is predicted to arrive for the given propulsive force and the rudder angle of the outboard motor 3 after elapsing of the prescribed incremental time when the external interference is taken into account by looking up the control map using the propulsive force, the rudder angle, the wind direction and the wind speed as parameters. The first corrected predicted position Pe1 is a point on the second route R2 that is obtained by considering interferences.

Next, the control unit 10 inputs the second predicted position P2 to the control map and produces the second corrected predicted position Pe2 based on the propulsive force, the rudder angle, the wind direction and the wind speed at this point. Again, the second corrected predicted position Pe2 is a point on the second route R2 that is obtained by considering interferences.

The control unit 10 repeats this process until the predicted position on the first route R1 that disregards the interference to the watercraft 2 reaches the target position Pt. Thereby, the second route R2 corresponding to one of the first routes R1 is obtained. This process is repeated until the second routes R2 (R2a, R2b, R2c) corresponding to all of the first routes R1 (R1a, R1b, R1c) are obtained.

Subsequently, the control unit 10 selects, as the optimum route, one of the second routes R2 (R2a, R2b, R2c) that avoids the obstacles 34 and allows the watercraft 2 to reach a position closest to the target position Pt (Step ST8 in FIG. 2). In the example shown FIG. 6, since the second route R2c fails to avoid the obstacles 34, it is not selected as the optimum route. The final corrected predicted position Ptb of the second route R2b is farther from the target position Pt than the final corrected predicted position Pta of the second route R2a. Therefore, the second route R2a is selected as the optimum route.

Once the optimum route is selected, the control unit 10 actually controls the propulsion drive unit 4 and the steering drive unit 5 of the outboard motor 3 so that the watercraft 2 travels along the first route R1a corresponding to the optimum route without considering the interference (step ST9 in FIG. 2), and the routine ends. However, since the watercraft 2 is subject to interferences, it actually navigates along the second route R2a which is the optimum route.

Thus, when the control unit 10 acquires the target position Pt in step ST4 (Yes), it computes a plurality of first routes R1 in step ST6, and computes the second routes R2 for each of the first routes R1 in step ST7. Then, in step ST8, one of the second routes R2 is selected as the optimum route, and in step ST9, the watercraft 2 is actually controlled to travel along the first route R1 corresponding to the optimum route. By this process, the watercraft 2 is automatically steered to the target position Pt along the first route R1 corresponding to the optimum route. Therefore, even the user is lacking in experience, and feels uneasy about docking the watercraft, the user can operate the watercraft with some confidence.

As described above, in step ST6, the control unit 10 computes the first routes R1 so as not to include a part having a radius of curvature smaller than the minimum turning radius of the watercraft 2. In this case, it is preferable to set the first route R1 so that the integrated value of the steering angle or the maximum steering angle is minimized, or the route length is minimized.

The present invention has been described with reference to a specific embodiment, but is not limited to the above embodiment, and can be modified without departing from the scope of the present invention. For example, the watercraft 2 in the above embodiment was a small vessel, but the watercraft 2 may be a large vessel, a water motorcycle, a pontoon, a runabout, or the like, and the watercraft 2 may be a cruiser boat or a fishing boat. The automatic watercraft piloting system 1 may include a GNSS 21 as a current position detection device, but in addition to GNSS 21 or instead of GNSS 21, the position of watercraft 2 may be detected by using information obtained from an IMU, LIDAR, camera, or the like.

In the automatic watercraft piloting system 1 of the illustrated embodiment, the second routes R2 were computed by the control unit 10 referring to the control map, but may also be computed by simulations or by using suitable formulas.

Since the control process of the present disclosure is not based on feedback control, a high level of robustness can be achieved. The setting of the first routes R1 is preferably performed by imposing appropriate constraints on the selection of the first routes R1, such as changing the initial orientation of the watercraft 2 in stages and avoiding sharp turns and excessive speed. Further, when the control map is used for the computation of the second routes R2, the computational load required for the computation of the second routes R2 can be minimized.

Not all of the components shown in the above embodiment are essential to the broad concept of the present invention, and may be appropriately selected, omitted, or substituted within the scope of the present invention. The contents of the references cited in this disclosure are incorporated into this application by reference.

The invention claimed is:

1. An automatic watercraft piloting system for assisting in piloting of watercraft from a start position to a target position, comprising:

a current position detecting device for detecting a current position of the watercraft;

an interference detecting device for identifying an interference that affects navigation of the watercraft, the interference detecting device comprising at least one of a communication device that receives meteorological and oceanographic information from a meteorological/oceanographic information station via a receiving antenna, a watercraft speedometer, a wind speed/direction meter, and a wave meter;

an input unit for accepting the target position of the watercraft;

an obstacle identification device that identifies an obstacle located between the current position and the target position;

a propulsion device that provides a propelling power to the watercraft, the propulsion device comprising a propeller, a drive source for driving the propeller, and a steering device that changes a heading of the watercraft; and a control unit for controlling the drive source and the steering device, the control unit comprising a processor, a memory, and a storage device, wherein the control unit is configured to set the start position when the target position is accepted by the input unit, acquire at least one of detected interference information including at least one of a wind direction, wind speed, wave direction, and wave period detected by the watercraft speedometer, the wind speed/direction meter, or the wave meter, and received interference information at the current position of the watercraft acquired via the communication device, compute a plurality of first routes from the start position to the target position that avoid any obstacle that may exist between the start position and the target position, wherein each of the plurality of first routes disregards the interference and includes a plurality of predicted positions, compute a second route for each of the first routes that the watercraft is predicted to travel when the drive source and the steering device are controlled by the control unit so as to follow the particular first route under the interference identified by the interference detecting device, wherein each second route includes a plurality of corrected predicted positions that are obtained by considering the interference, the plurality of corrected predicted positions of each second route including a final corrected predicted position which is an end position of the second route, select one of the second routes whose final corrected predicted position is nearest to the target position as an optimum route, and control the drive source and the steering device so as to cause the watercraft to progress along the first route that corresponds to the optimum route in absence of the interference.

2. The automatic watercraft piloting system according to claim 1, wherein the control unit computes the first routes so that initial headings of the watercraft include a plurality of different headings.

3. The automatic watercraft piloting system according to claim 1, wherein the control unit computes the first routes such that a minimum radius of curvature of each first route is larger than a minimum turning radius of the watercraft.

4. The automatic watercraft piloting system according to claim 1, wherein the control unit is provided with a control map that gives a deviation of the watercraft from a nominal course for each combination of a rudder angle and a propulsion force of the watercraft, and the interference, and is configured to compute the second routes by looking up the control map.

5. The automatic watercraft piloting system according to claim 4, wherein the deviation includes a positional error and a heading error.

6. The automatic watercraft piloting system according to claim 5, wherein the values of the positional error and the heading error are determined from a computer simulation.

7. The automatic watercraft piloting system according to claim 5, wherein values of the positional error and the heading error are determined by taking into account a past operation record of the watercraft.

8. The automatic watercraft piloting system according to claim 1, wherein the interference includes a wind direction and a wind speed.

9. The automatic watercraft piloting system according to claim 1, wherein the obstacle identification device includes an obstacle sensor that detects a surrounding obstacle, and/or an obstacle information acquiring device that acquires information on the obstacle from an external information source.

10. The automatic watercraft piloting system according to claim 1, wherein the interference detecting device includes an interference sensor that detects an actual interference at the start position, and/or an interference information acquiring device that acquires information on the interference from an external information source.

11. An automatic watercraft piloting assist method for assisting in piloting of watercraft from a start position to a target position, wherein the watercraft is provided with a propulsion device comprising a propeller, a drive source for driving the propeller, and a steering device, and the automatic watercraft piloting assist method is configured to be implemented by a computer to execute the steps of:

acquiring a current position of the watercraft;

identifying an interference that affects navigation of the watercraft;

acquiring the target position;

setting the start position, and identifying an obstacle that may be located between the start and the target position;

acquiring at least one of detected interference information including at least one of a wind direction, wind speed, wave direction, and wave period detected by a watercraft speedometer, a wind speed/direction meter, or a wave meter, and received interference information at the current position of the watercraft acquired via a communication device;

computing a plurality of first routes from the start position to the target position that avoid any obstacle that may exist between the start position and the target position, wherein each of the plurality of first routes disregards the interference and includes a plurality of predicted positions;

computing a second route for each of the first routes that the watercraft is predicted to travel when the drive source and the steering device are controlled by a control unit so as to follow the particular first route under the identified interference, wherein each second route includes a plurality of corrected predicted positions that are obtained by considering the interference, the plurality of corrected predicted positions of each second route including a final corrected predicted position which is an end position of the second route;

selecting one of the second routes whose final corrected predicted position is nearest to the target position as an optimum route; and controlling the drive source and the steering device so as to cause the watercraft to progress along the first route that corresponds to the optimum route in absence of the interference.

* * * * *